United States Patent
Takaku et al.

(10) Patent No.: US 8,078,883 B2
(45) Date of Patent: *Dec. 13, 2011

(54) PERSONAL AUTHENTICATION APPARATUS AND PERSONAL AUTHENTICATION METHOD

(75) Inventors: Kazuo Takaku, Inagi (JP); Shinichi Eguchi, Inagi (JP); Katsuhiro Egawa, Inagi (JP); Yoshiaki Kitamura, Inagi (JP); Ikuo Mutou, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1262 days.

This patent is subject to a terminal disclaimer.

(21) Appl. No.: 11/167,562

(22) Filed: Jun. 28, 2005

(65) Prior Publication Data
US 2006/0174135 A1    Aug. 3, 2006

(30) Foreign Application Priority Data
Jan. 31, 2005   (JP) ................................ 2005-023648

(51) Int. Cl.
*G06F 21/00* (2006.01)

(52) U.S. Cl. ........ 713/186; 235/375; 235/379; 235/380; 235/382; 705/79; 705/29; 705/44; 705/5; 705/64; 382/124; 382/115; 382/127; 382/100; 382/125; 382/210; 356/71; 709/225

(58) Field of Classification Search .................... 713/186
See application file for complete search history.

(56) References Cited

U.S. PATENT DOCUMENTS

| | | | |
|---|---|---|---|
| 7,725,733 B2 * | 5/2010 | Higashiura et al. ............ | 713/186 |
| 2001/0026632 A1 * | 10/2001 | Tamai ............................ | 382/116 |
| 2002/0073213 A1 * | 6/2002 | Mekata et al. ................ | 709/229 |
| 2003/0056122 A1 * | 3/2003 | Wuidart ......................... | 713/202 |
| 2004/0042642 A1 * | 3/2004 | Bolle et al. .................... | 382/115 |
| 2004/0071322 A1 | 4/2004 | Choshi et al. | |

FOREIGN PATENT DOCUMENTS

| | | |
|---|---|---|
| JP | 2002-312317 | 10/2002 |
| JP | 2003-85539 | 3/2003 |
| JP | 2003-248660 | 9/2003 |
| JP | 2003-331290 | 11/2003 |
| JP | 2004-112172 | 4/2004 |
| WO | WO 01/98912 | 12/2001 |

OTHER PUBLICATIONS

Extract of Japanese Patent Application Publication No. 2003-248660.

* cited by examiner

*Primary Examiner* — Nathan Flynn
*Assistant Examiner* — Bryan Wright
(74) *Attorney, Agent, or Firm* — Westerman, Hattori, Daniels & Adrian, LLP (57) ABSTRACT

According to the present invention, first, the first biometric information "a" is divided equally and biometric information "a'" and biometric information "a''" are generated, the second biometric information "b" is divided equally and biometric information "b'" and biometric information "b''" are similarly generated. Then the biometric information "a'" that is the first half of the first biometric information "a" and the biometric information "b'" that is the first half of the second biometric information "b" are combined to generate one piece of biometric information 1 for a person. The biometric information "a''" that is the second half of the first biometric information "a", and the biometric information "b''" that is the second half of the second biometric information "b", are similarly combined to generate the other piece of biometric information 2 for the person. The biometric information 1 and 2 are stored and used for matching later.

14 Claims, 10 Drawing Sheets

PERSONAL AUTHENTICATION APPARATUS AND PERSONAL AUTHENTICATION METHOD

BACKGROUND OF THE INVENTION

1. Field of the Invention

The present invention relates to a personal authentication apparatus and a personal authentication method that register biometric information unique to each individual person, and obtain the person's biometric information anew when performing authentication, and check it against the registered biometric information to authenticate the person.

2. Description of the Related Art

Facilities and equipment that require personal authentication for the opening and closing entrance doors of rooms or buildings or operating information processing devices, for example, in order to improve security or protect privacy have proliferated in recent years. For such authentication, code numbers have been widely used traditionally. In recent years, more secure personal authentication methods are becoming widespread in which sensors are provided to detect some biometric information unique to every individual for performing personal authentication (see Japanese Patent Laid-Open No. 2003-85539, No. 2004-112172).

A problem with a code number is that, if it is known to other person, the person can readily impersonate the holder of the code number. In contrast, personal authentication that relies on biometric information, which varies from person to person, can significantly reduce threat of impersonation.

In a system in which biometric information is used for personal authentication, it is required to improve security.

As one of the techniques to improve security, a technique in which information used for authentication is divided into multiple parts and managed separately or permutated has been proposed (see Japanese Patent Laid-Open No. 2002-7349, No. 2002-312317, No. 2003-248660, No. 2003-331290).

The technique significantly improves security, as information used for authentication is divided into multiple parts and managed separately or permutated and correct information can only be restored by collecting separately managed parts of information or put the permutated order to the original order.

Even if information used for authentication is divided into multiple parts and managed separately or permutated, the authentication information can be rebuilt by putting the parts together or putting the permutated order to the original order. If someone who is seeking ways to steal the information is aware that the information is managed separately or permutated in the system, the system may not be completely secure.

SUMMARY OF THE INVENTION

The present invention has been made in view of the above circumstances and provides a personal authentication apparatus and a personal authentication method.

The present invention provides a personal authentication apparatus that stores biometric information of a person obtained at past registration, and checks the person's biometric information obtained at the current authentication against the biometric information obtained and stored at the registration to authenticate the person including: an information obtaining section which obtains personal biometric information; an information converting section that causes the information obtaining section to obtain multiple kinds of original biometric information for the person, and subjects the multiple kinds of original biometric information to scrambling, in which respective parts of multiple kinds of original biometric information are exchanged each other to make multiple kinds of scrambled biometric information, to register the personal biometric information, and converts the multiple kinds of scrambled biometric information into the multiple kinds of original biometric information by descrambling inversely to the scrambling to authenticate the person; an information storing section that stores the multiple kinds of scrambled biometric information for each person obtained by the scrambling at the information converting section; and a personal authentication section that authenticates a person being concerned with the currently obtained biometric information for authentication by receiving the currently obtained biometric information for authentication from the information obtaining section, and receiving the multiple kinds of original biometric information obtained by causing the information converting section to descramble the multiple kinds of scrambled biometric information, which is obtained by scrambling the multiple kinds of original biometric information obtained at registration and stored, into the multiple kinds of original biometric information and, and checking the biometric information for authentication against each of the multiple kinds of original biometric information.

The personal authentication apparatus according to the present invention obtains multiple kinds of biometric information for one person and exchanges respective parts of the multiple kinds of biometric information and stores the information. The resulted biometric information may appear to be usual biometric information without any manipulation. Thus, someone seeking ways to steal biometric information has no idea of descrambling the information and the advanced security can be kept.

In the personal authentication apparatus according to the present invention, preferably, the information obtaining section obtains the person's ID or an ID of a group to which the person belongs that is associated with the person in addition to the person's biometric information, and the information storing section preferably stores both an ID associated with the person obtained by the information obtaining section and multiple kinds of scrambled biometric information of the person obtained by scrambling at the information converting section without directly associating them with each other, and stores associating information that associates the ID with the multiple kinds of scrambled biometric information to register the personal biometric information.

The present invention further improves security by making correspondence between an ID and scrambled biometric information unknown to a malicious user as the invention stores both the ID and the scrambled biometric information without directly associating them with each other and also stores associating information that associates the ID and the scrambled biometric information separate from the ID and the scrambled biometric information as mentioned above.

In the personal authentication apparatus according to the present invention, preferably, the personal authentication section preferably causes the information obtaining section to obtain biometric information for authentication corresponding to one of multiple kinds of original biometric information of the person obtained at registration, and checks the biometric information for authentication against each of the multiple kinds of original biometric information obtained by descrambling at the information converting section, and determines whether the biometric information for authentication matches one of the multiple kinds of original biometric information to authenticate the person.

It is convenient that authentication is performed on the basis of a kind of authentication information, for example, for only a right palm or a left palm.

In the personal authentication apparatus according to the present invention, the personal authentication section with a function of obtaining IDs can be adapted to cause the information obtaining section to obtain both an ID corresponding to a person and biometric information that authenticates the person and check the biometric information for authentication against each of the multiple kinds of original biometric information obtained by descrambling the multiple kinds of scrambled biometric information associated with the same ID as the obtained ID according to the associating information to authenticate the person, or the personal authentication section with or without a function of obtaining IDs can be adapted to check biometric information for authentication obtained by the information obtaining section against each of the multiple kinds of original biometric information for registered persons to authenticate the person.

If the apparatus is adapted to be input not only biometric information but also an ID at authentication, security is further improved but a task of inputting an ID is added.

In the personal authentication apparatus according to the present invention, the information obtaining section preferably includes a biometric information sensor that detects biometric information. As a preferable example, the biometric information sensor can be a sensor for detecting a biometric pattern.

The present invention provides a personal authentication method that stores biometric information of a person obtained at past registration, and checks the person's biometric information obtained at the current authentication against the biometric information obtained and stored at the registration to authenticate the person including the steps of: obtaining multiple kinds of original biometric information for the person, and subjects the multiple kinds of original biometric information to scrambling, in which respective parts of multiple kinds of original biometric information are exchanged each other to make multiple kinds of scrambled biometric information, and stores the multiple kinds of scrambled biometric information to register the personal biometric information; and obtaining biometric information for authentication, and converting the multiple kinds of scrambled biometric information, which is obtained by scrambling the multiple kinds of original biometric information obtained at registration and stored, by descrambling inversely to the scrambling, into the multiple kinds of original biometric information, and checking the biometric information for authentication against each of the multiple kinds of original biometric information to authenticate the person concerned with the currently obtained biometric information.

As mentioned above, the present invention improves security against theft or the like of authentication information.

BRIEF DESCRIPTION OF THE DRAWINGS

Preferred embodiments of the present invention will be described in detail based on the following figures, wherein.

DETAILED DESCRIPTION OF THE INVENTION

An embodiment of the present invention will be described below.

Figure 1:
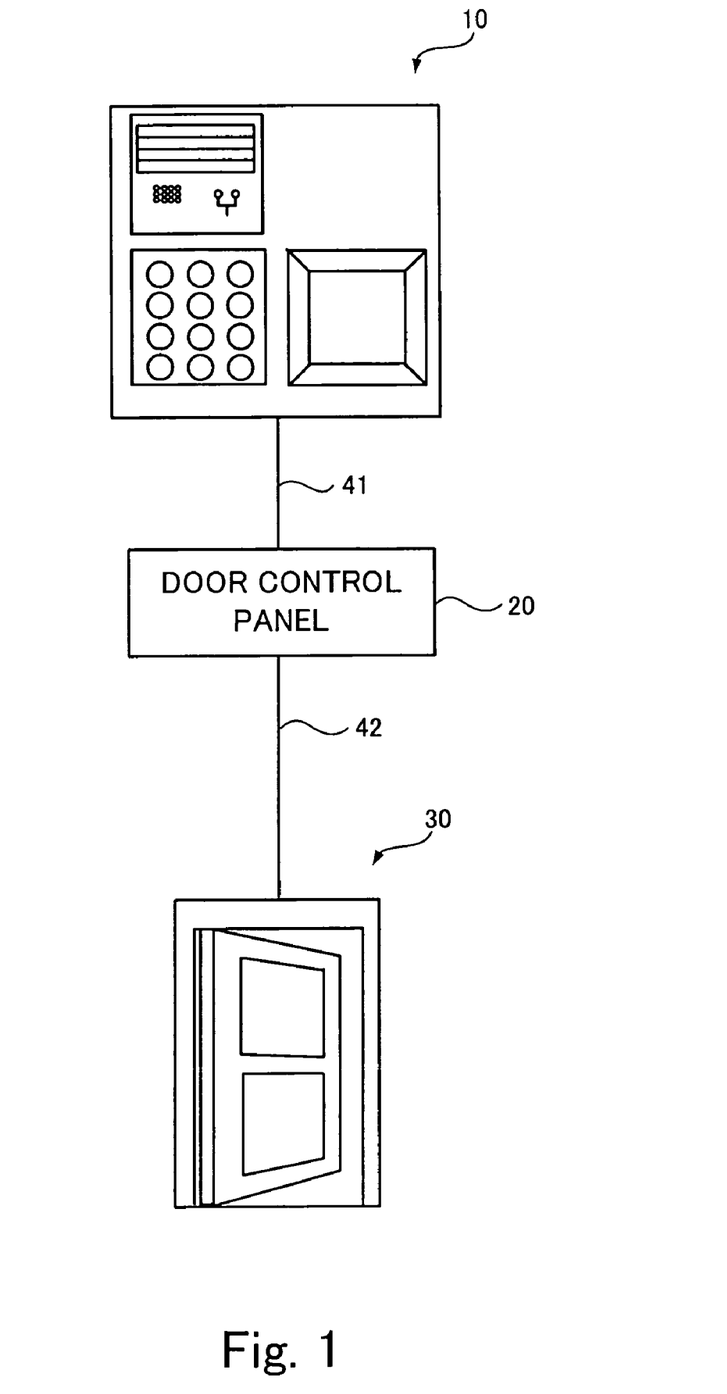
FIG. 1 shows an overview of a door control system in which a personal authentication apparatus according to one embodiment of the present invention is incorporated.

FIG. 1 shows an overview of a door control system in which a personal authentication apparatus according to one embodiment of the present invention is incorporated.

Shown in FIG. 1 are, a gate controller 10, a door control panel 20, and a door 30, which are interconnected through lines 41 and 42.

The door 30 is provided at the entrance of a building or a condominium or a room, for example, and includes an electric lock (not shown), which is locked and unlocked through control from the door control panel 20.

The door control panel 20 drives the electric lock of the door 30 over the line 42 under the control of the gate controller 10 over the line 41.

The gate controller 10 is provided near the door 30, performs personal authentication to determine whether a person is authorized to pass through the entrance at which the door 30 is provided and, if it determines that the person is authenticated to pass through the entrance, provides a control signal to the door control panel 20 over the line 41 to cause it unlock the electric lock on the door 30.

Figure 2:
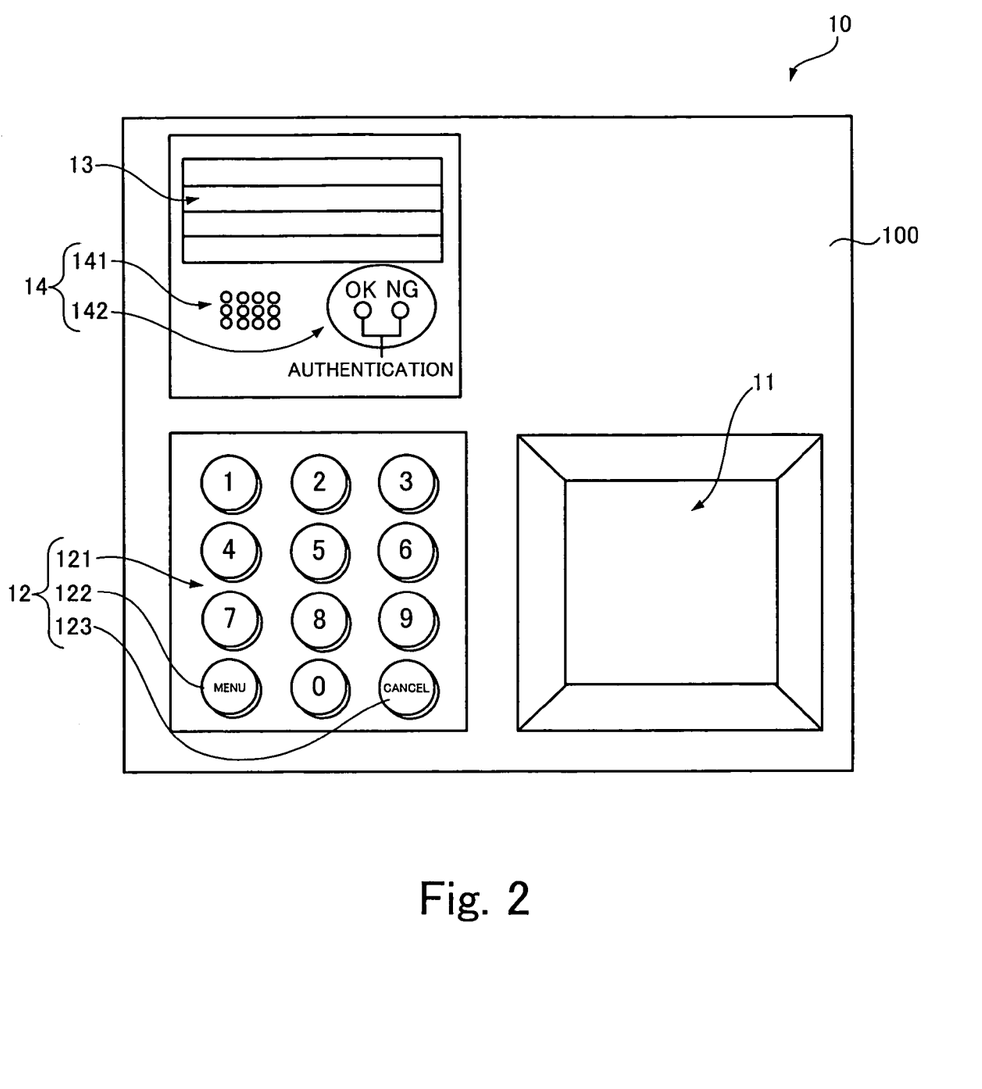
FIG. 2 shows an operation panel of a gate controller.

FIG. 2 shows an operation panel on the gate controller 10.

Provided on the operation panel 100 of the gate controller 10 are a biometric information sensor 11, a keyboard 12, an input/output display 13, and alarm mechanism 14.

The biometric information sensor 11 detects biometric patterns in the present embodiment. When a palm is placed over the biometric information sensor 11, the sensor 11 detects the biometric pattern on the palm placed over the biometric information sensor 11 by using infrared rays.

The keyboard 12 includes a ten-key pad 121 labeled with numbers 0 to 9, a menu key 122, and a cancel key 123, which are push buttons to be depressed for inputting a user ID or using a control function of the gate controller 10.

The input/output display 13 displays the ID input by a user, the result of execution of a control function of the gate controller 10, operation guidance for a user, and an alarm message or the like.

The alarm mechanism 14 includes an audio output section 141 having a beeper inside it and a light emitting section 142 in which LEDs are provided and indicates the result of authentication by beeping and turning on a lamp.

Figure 3:
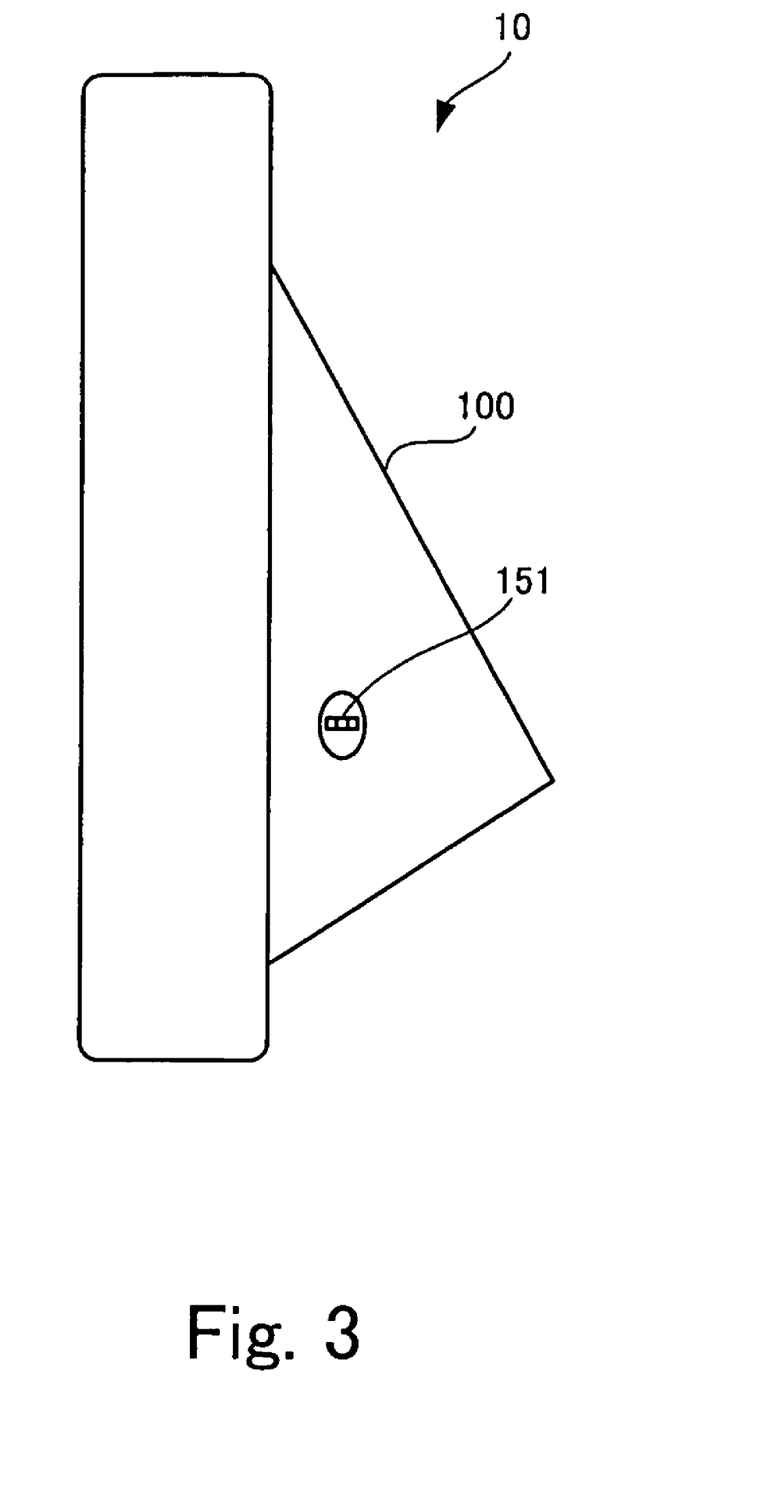
FIG. 3 shows a side view of the gate controller.

FIG. 3 shows a side view of the gate controller 10.

The gate controller 10 has a structure intended to be mounted on a wall in a building or room near the door 30 shown in FIG. 1. The operation panel 100 is slanted upward. Provided on a side wall of the gate controller 10 is a keyhole 151 into which a physical key (an administrator key) is fit. When a specific administrator key is inserted into the keyhole 151, the inserted key can be turned to a predetermined angle. When the administrator key is inserted and turned, the gate controller 10 recognizes that it is operated by a right key. In the present embodiment, inserting and turning a right key in the keyhole 151 is referred to as setting a key.

Figure 4:
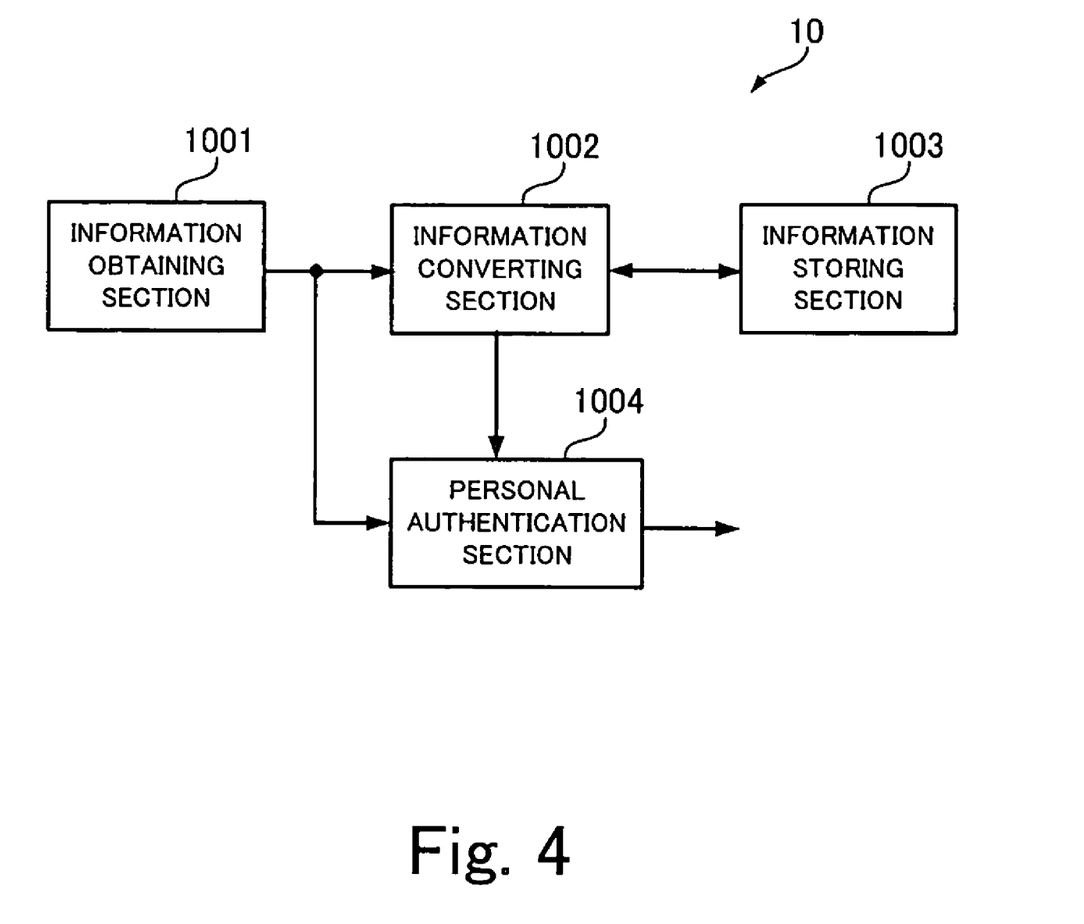
FIG. 4 is a functional block diagram of the gate controller shown in FIG. 1-FIG. 3.

FIG. 4 is a functional block diagram of the gate controller 10 shown in FIG. 1-FIG. 3.

The gate controller 10 includes an information obtaining section 1001, an information converting section 1002, an information storing section 1003, and a personal authentication section 1004.

The information obtaining section 1001 corresponds to what the biometric information sensor 11 shown in FIG. 2 and the keyboard 12 shown in FIG. 2 are combined in the present embodiment and obtains a personal ID and biometric information. The ID can be either what identifies the person or what identifies a group to which the person belongs. For example, in a system that controls a door at the entrance of a condominium, the person's room number can be used as the ID, which can be used by all the people who live in the room.

The information obtaining section 1001 detects a biometric pattern of the person's palm as biometric information of the person.

The information converting section 1002 is responsible for causing the information obtaining section 110 to obtain multiple kinds of original biometric information for one person (usually, biometric patterns of left and right hands), and subjecting the multiple kinds of original biometric information to scrambling, in which respective parts of the multiple kinds of original biometric information are exchanged each other to make multiple kinds of scrambled biometric information to register a personal biometric information, and converting the multiple kinds of scrambled biometric information into the multiple kinds of original biometric information by descrambling inversely to the scrambling to authenticate the person.

The information storing section 1003 stores multiple kinds of scrambled biometric information for each person, which are obtained by scrambling at the information converting section 1002. In the present embodiment, the information storing section 1003 further stores an ID associated with the person, which is obtained by the information obtaining section 1001 to register personal biometric information. The information storing section 1003 is adapted to store both the IDs and multiple kinds of scrambled biometric information without directly associating them each other and to store associating information that associates the IDs with the multiple kinds of scrambled biometric information separately from the IDs and the multiple kinds of scrambled biometric information.

The personal authentication section 1004 authenticates a person being concerned with the currently obtained biometric information for authentication in the following manner. First, the personal authentication section 1004 receives: the currently obtained biometric information for authentication from the information obtaining section 1001 to authenticate the person; and the multiple kinds of original biometric information obtained by causing the information converting section 1002 to descramble the multiple kinds of scrambled biometric information into the multiple kinds of original biometric information. The multiple kinds of scrambled biometric information has been obtained by converting the multiple kinds of original biometric information obtained at registration into the multiple kinds of scrambled biometric information and stored. Then, the personal authentication section 1004 checks the biometric information for authentication against each of the multiple kinds of original biometric information. The personal authentication section 1004 employs a method of causing the information obtaining section 1001 to obtain biometric information for authentication corresponding to one of the multiple kinds of original biometric information (a biometric pattern of a right or left hand in this example) for the person obtained at registration, and checking the biometric information for authentication against each of the multiple kinds of original biometric information obtained by descrambling at the information converting section 1002, and determining whether the biometric information for authentication matches one of the multiple kinds of original biometric information to authenticate the person. In the present embodiment, this personal authentication section employs a method of causing the information obtaining section 1002 to obtain both an ID associated with a person and the biometric information for authentication for the person, and checking the biometric information for authentication against each of the multiple kinds of original biometric information, which is obtained by descrambling the multiple kinds of scrambled biometric information corresponding to the same ID as the ID obtained by the abovementioned associating information to authenticate the person. The personal authentication section 1004 may adopt a method of causing the information obtaining section 1001 to obtain only the biometric information for personal authentication without requiring to obtain an ID and checking the biometric information for authentication against each of the registered multiple kinds of original biometric information for multiple persons to authenticate the person.

The configuration of FIG. 4 will be described in more detail for registration and authentication separately below.

Figure 5:
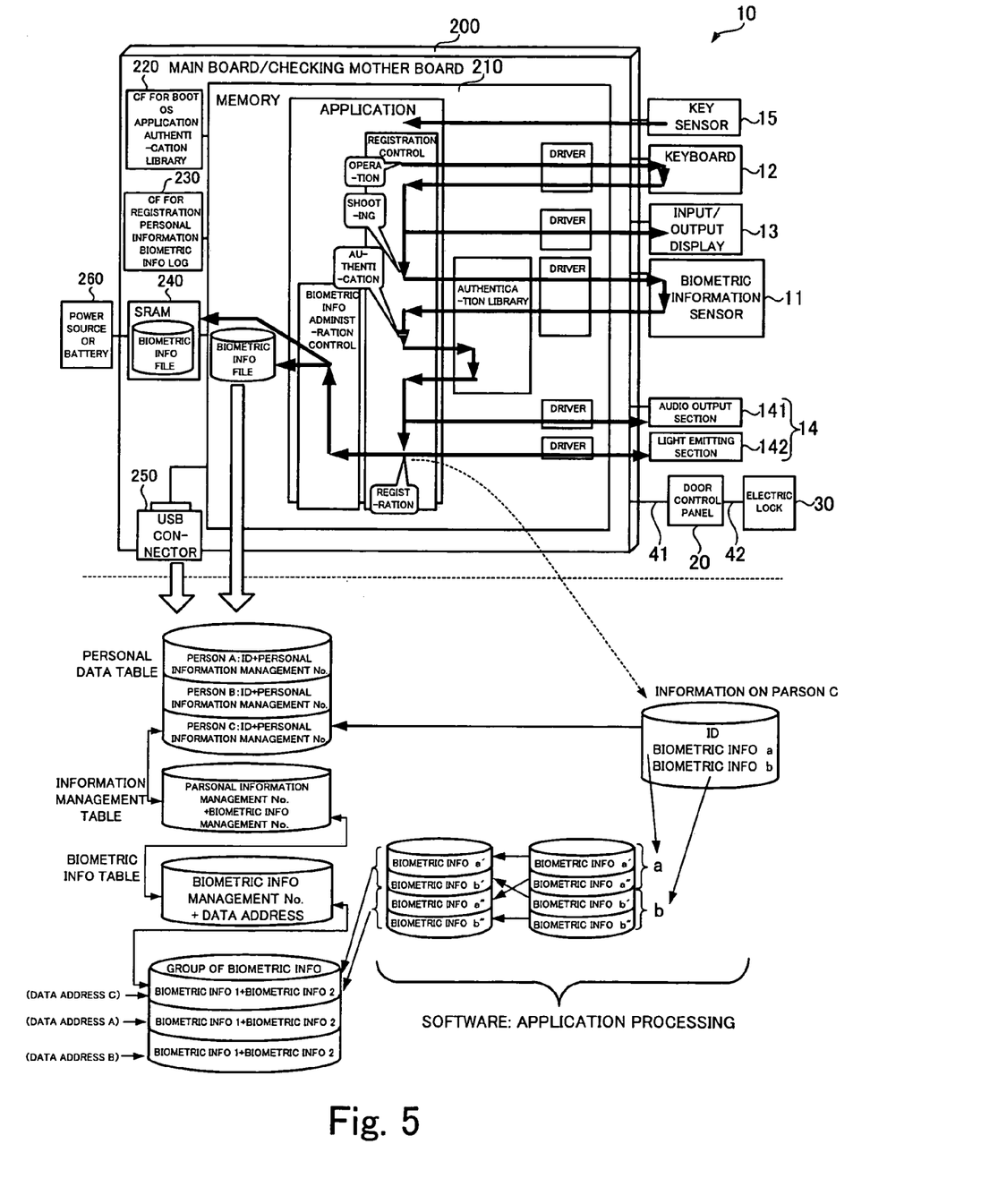
FIG. 5 is a diagram showing an inside configuration and a file configuration of the gate controller.

FIG. 5 is a diagram showing an inside configuration and a file configuration of the gate controller.

Provided in the gate controller 10 is a main board/checking mother board 200, on which a memory 210, a CF (Compact Flash (registered trademark)) for Boot 220, a CF for registration 230, SRAM 240 and a USB connector 250 are mounted. The SRAM 240 on the main board/checking mother board 200 stores a biometric information file (described later) with energized by a power source or battery 260. When the power supply stops, memory content of the SRAM 240 is erased. On the main board/checking mother board 200, a CPU that executes a program expanded on the memory 210, an interface circuit that exchanges signals with the key sensor 15 and the keyboard 12 etc. shown right to the main board/checking mother board 200 and the like are also mounted, which are neither shown nor described here.

Provided on the gate controller 10 are, in addition to various parts and the power source or battery 260 mounted on the main board/checking mother board 200, the key sensor 15, keyboard 12, input/output display 13, biometric information sensor 11, alarm mechanism 14 including the audio output section 141 and light emitting section 142, which are shown right to the main board/checking mother board 200 in FIG. 5. Connected to the main board/checking mother board 200 via a communication line 41 is the door control panel 20 also shown in FIG. 1, to which an electric lock 30 is connected via a communication line 42.

The key sensor 15 recognizes that a specific administrator key inserted into the keyhole 151 shown in FIG. 3 and turned (that a key is set).

As the keyboard 12, the input/output display 13, the biometric information sensor 11 and the alarm mechanism 14 are shown in FIG. 1 and FIG. 2 and have already described, they are not described here again.

The CF for Boot 220 mounted on the main board/checking mother board 200 stores an OS (operating system), an application, an authentication library and various kinds of driver, etc., which are expanded on the memory 210 and executed on the CPU (not shown). The application is a program mainly responsible for registration control and biometric information administration control as schematically depicted on the memory 210. The authentication library is a program responsible for personal authentication. The various drivers are programs responsible for sending/receiving signals to/from the keyboard 12 or the input/output display 13, for example.

The CF for registration 230 mounted on the main board/checking mother board 200 stores logs (histories) of registration and authentication of IDs and biometric information.

Registered biometric information and the like are stored in a biometric information file set on the memory 210 and also stored in a biometric information file set on the SRAM 240 for back up. If the package of the gate controller 10 shown in FIG. 1 to FIG. 3 is broken to open, the contents of the biometric information file are immediately deleted.

The USB connector 240 is compliant with the USB standard. When USB memory (not shown), which is a kind of portable memory, is inserted in the USB connector 240 with the administrator key set and a predetermined operation is performed, data for personal authentication, such as biometric information, is downloaded to the USB memory, or data for personal authentication, such as biometric information, is uploaded from the USB memory to the memory 210.

This is for copying data for personal authentication, such as biometric information, to a gate controller 10 on each floor, when the gate controller 10 is set at each entrance on the first floor, the second floor and the third floor of a building and only the same person is admitted. The USB memory storing data for personal authentication is administered by its administrator. Even if the USB memory is stolen, data on the memory is unlikely to be abused as the data is converted in the way described later.

The data converting processes and the contents of a biometric information file shown in the upper part of FIG. 5 will be included in the description of registration processes provided below with reference to flowcharts.

Figure 6:
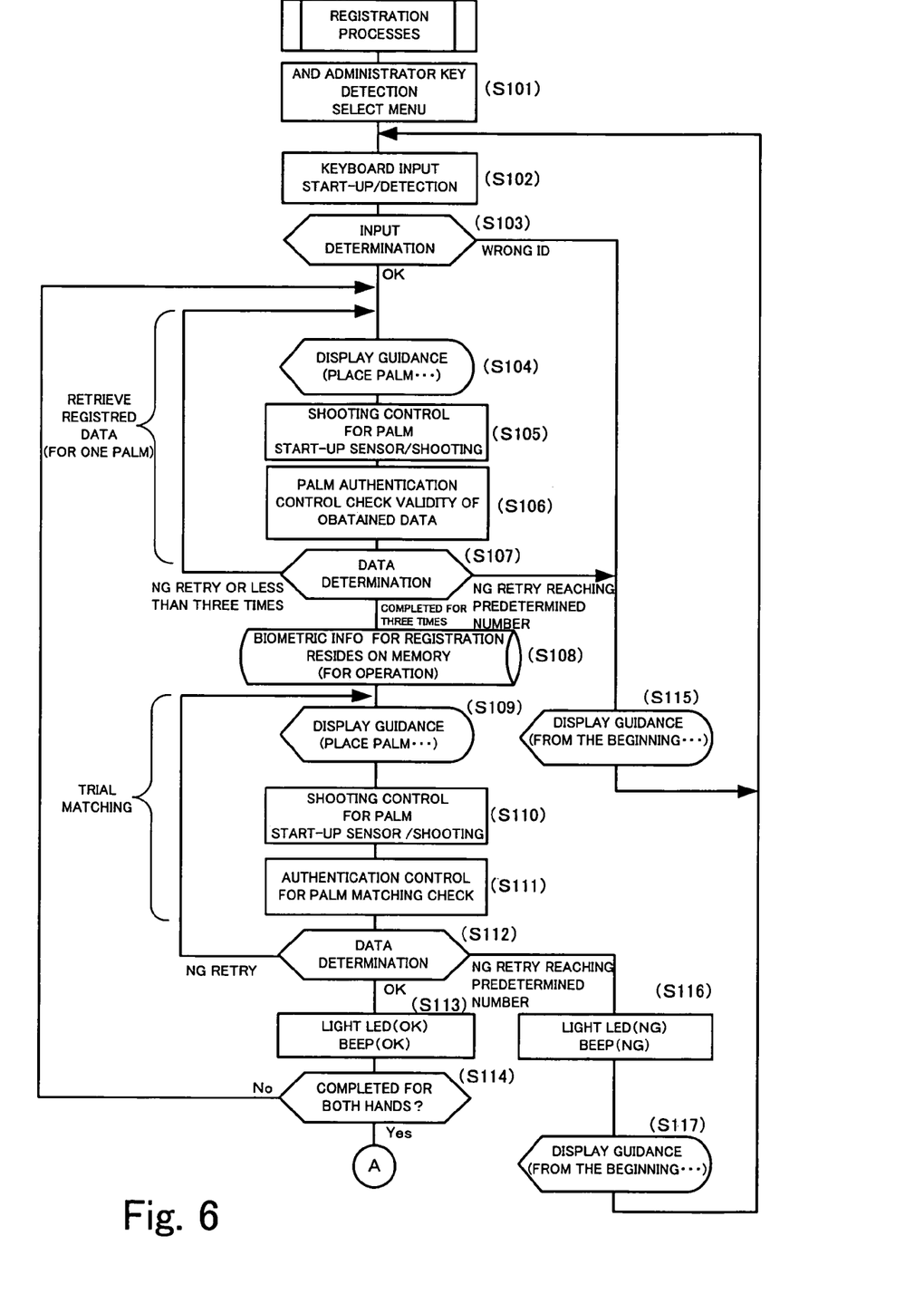
FIG. 6 is a first half of a flowchart for registration processes executed on the gate controller shown in FIG. 5.
Figure 7:
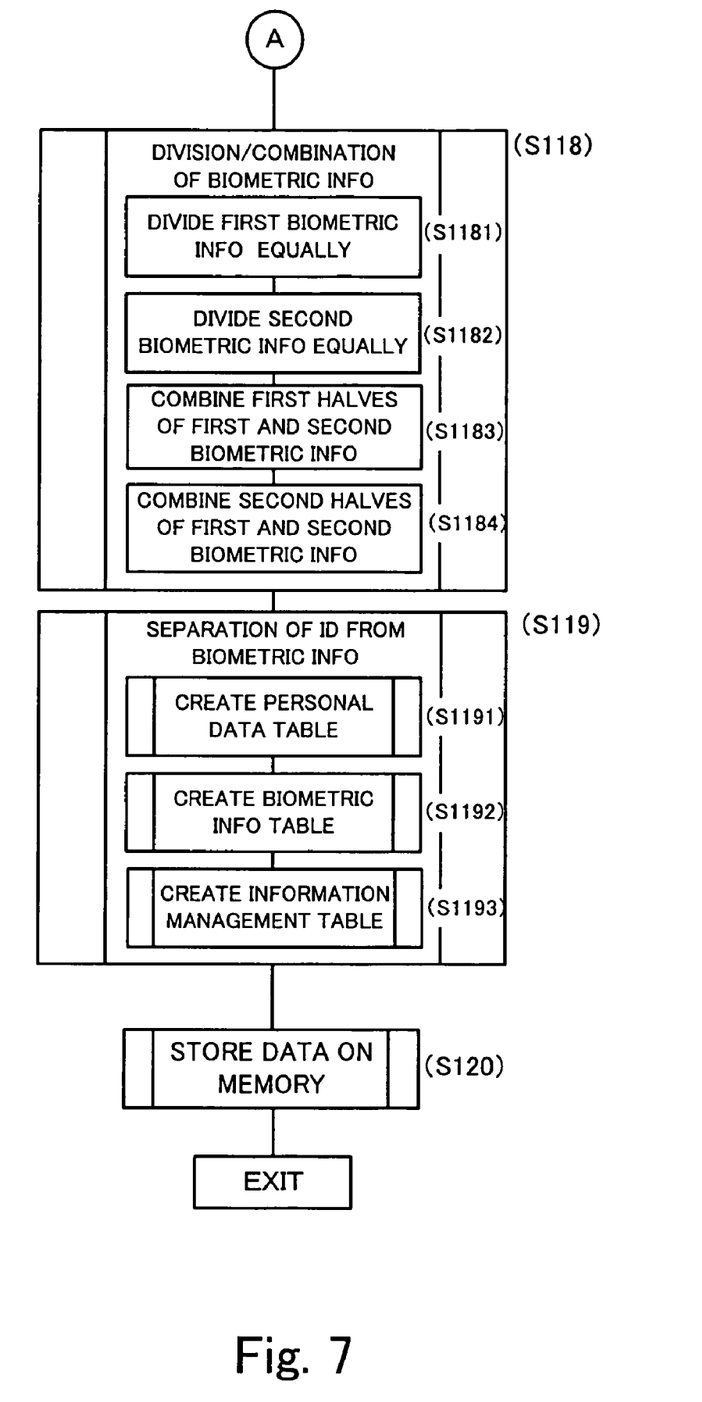
FIG. 7 is a second half of a flowchart for registration processes executed on the gate controller shown in FIG. 5.

FIGS. 6 and 7 are the first half and the second half of a flowchart of registration processes executed on the gate controller shown in FIG. 5.

When the key sensor 15 detects that the administrator key is set and the menu button 122 (see FIG. 2) is pressed, a menu including various operations for administration is displayed on the input/output display in association with numbers (step S101 in FIG. 6). It is assumed that the number corresponding to "Register" on the menu is pressed here. Although various processes including processes that delete a registration of a person are prepared as an item other than the registration processes in the menu for administration, the processes are not the subject of the present embodiment and only the registration processes in the menu will be described.

The application starts an input sensor of the keyboard (a balloon "Operation" in FIG. 5), and the ID, which is formed of four digits here, input through the keyboard is detected (step S102). Then determination whether the detected ID is the right ID or not is performed (step S103). The wrong ID is, for example, an ID formed of a room number which does not exist in the condominium whose entrance has the gate controller 10, or a registered ID where an ID belongs to a person.

When the ID is determined right at step S103, the process proceeds to step S104, where guidance to ask the person to place his palm over the biometric information sensor 11 is displayed on the input/output display 13. When the ID is determined wrong at step S103, guidance to repeat the operation from the beginning is displayed on the input/output display 13 (step S115) and the application waits for an ID to be input through the keyboard 12 (step S102).

When the ID is determined right at step S103 and guidance to ask the person to place his palm over the biometric information sensor 11 is displayed at step S104, shooting control for the palm is performed (step S105; a balloon "Shooting" in FIG. 5). Taking biometric information of a palm is referred to as "shooting" here, as the data is taken by infrared sensor that shoots the palm placed over the biometric information sensor 11.

At step S105, the biometric information sensor 11 starts and a palm is shot.

When a palm is shot, the application requests an authentication library to check whether the currently taken biometric information is appropriate as the base for authentication (a balloon "Authentication" in FIG. 5) and receives the check result (step S106).

When the check result is NG, i.e., the data is not appropriate as the base to be used for the authentication (step S107), the process returns to step S104, where the person is prompted to place his palm over again. If NG is given for predetermined number of times, the process proceeds to step S115, where it is displayed that the operation should be repeated from the beginning, and the process returns to step S102.

Biometric information (data) is obtained for the same palm of a right hand and a left hand for three times and the basic biometric information for authentication is generated for the hand on the basis of the biometric information obtained for three times. Therefore, even when the check result is OK, i.e., when the check result indicates that the currently obtained biometric information is right at step S107, determination for whether the data is obtained for three times is performed and when the data is obtained for less than three times, the process also returns to step S104.

When the biometric information with the check result of OK is obtained for three times, biometric information for registration is created on the basis of the three times biometric information and stored in a work area on memory (step S108). Then, guidance is displayed for the person to place the same palm over the input/output display 13 (step S109), shooting control for the palm is performed (step S110), and a "trial matching" is performed by requesting the authentication library to check the biometric information obtained by the current shooting against the biometric information created for registration and receiving the check result (step S111).

When NG is given as the trial matching result, i.e., when the check result indicating that the pieces of data do not match is given (step S112), the process returns to step S109, where trial matching is performed again. If the trial matching is repeated for a few times and still NG is given, the process proceeds to step S116, where a light of LED indicating NG on the light emitting section 142 and beeps indicating NG from the audio output section 141 inform that the authentication fails, and at the same time, guidance to repeat the registration operation from the beginning is displayed on the input/output display 13 at step S117 and the process proceeds to step S102.

When OK is given as the trial matching result, i.e., when the pieces of data matched, the process proceeds to step S113, where a light of LED indicating OK on the light emitting section 142 and beeps indicating OK from the audio output section 141 inform that the authentication succeeds.

Determination whether the abovementioned processes have been completed for both hands is performed at step S114. If the processes have been completed for only one palm, i.e., left or right palm, the process proceeds to step S104, where registration data for the other hand is extracted and trial matching is performed.

The registration processes for the palm processed later, i.e., left or right, can be stopped by pressing the cancel button 123 on the keyboard 12 shown in FIG. 2 at any stage before OK is given by the data determination at step S112.

When registration data extraction processes and trial matching have been performed for both hands, division/combination processes of biometric information (step S118) and separation processes of an ID from biometric information (step S119) shown in FIG. 7 are performed on the application shown in FIG. 5 and the results are stored in a biometric information file on the memory 210 and the SRAM 240 (a balloon "Registration" in FIG. 5).

Separation/combination processes of biometric information (step S118) in FIG. 7 will be described with reference to FIG. 5.

It is assumed that registration processes for a person C is performed here, and the person C's ID, biometric information "a" that registers the person C (data for one of both hands), biometric information "b" that registers the person C (data for the other of both hands) are obtained.

The biometric information division/incorporation processes at step S118 shown in FIG. 7 is an example of the scrambling according to the present invention. First, the first biometric information "a" is divided equally and biometric information "a'" and biometric information "a''" are generated (step S1181), the second biometric information "b" is divided equally and biometric information "b'" and biometric information "b''" are generated in the same way (step S1182), then biometric information "a'", the first half of the first biometric information "a", and biometric information "b'", the first half of the second biometric information "b", are combined and one piece of biometric information 1 for the person C is generated (step S1183), and biometric information "a''", the second half of the first biometric information "a", and biometric information "b''", the second half of the second biometric information "b", are in the same way combined and the other piece of biometric information 2 for the person C is generated (step S1184). The pieces of biometric information 1 and 2 are examples of the scrambled biometric information according to the present invention. Other processes including encryption processes can be performed in addition to separation/combination processes of biometric information here, but the encryption processes themselves are the same as those in the conventional art, thus, the description thereof is omitted.

The pieces of biometric information 1 and 2 generated in this manner are stored in a biometric information file on the memory 210 and the SRAM 240 shown in FIG. 5.

Although the first halves of biometric information "a" and "b" are combined and the second halves of biometric information "a" and "b" are combined in this example, the first half of biometric information "a" and the second half of biometric information "b" can be combined to make one piece of biometric information and the first half of biometric information "b" and the second half of biometric information "a" can be combined to make the other piece of biometric information. In such a case, each piece of biometric information "a" and "b" need not be divided equally and can be divided for ⅓ and ⅔, for example.

In the application shown in FIG. 5, the abovementioned division/combination processes of biometric information (step S118) shown in FIG. 7 is followed by separation processes of an ID from biometric information (step S119).

The separation processes of an ID from biometric information (step S119) include personal data table creating processes (step S1191), biometric information table creating processes (step S1192) and information management table creating processes (step S1193).

Figure 8:
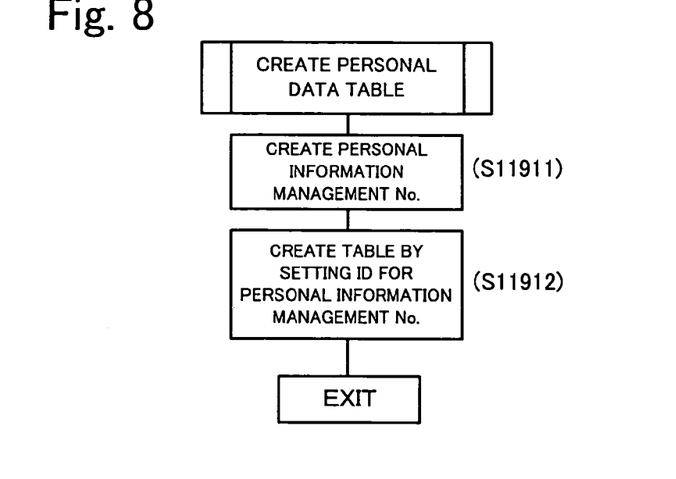
FIG. 8 is a flowchart showing the contents to be processed in personal data table creation processes.
Figure 9:
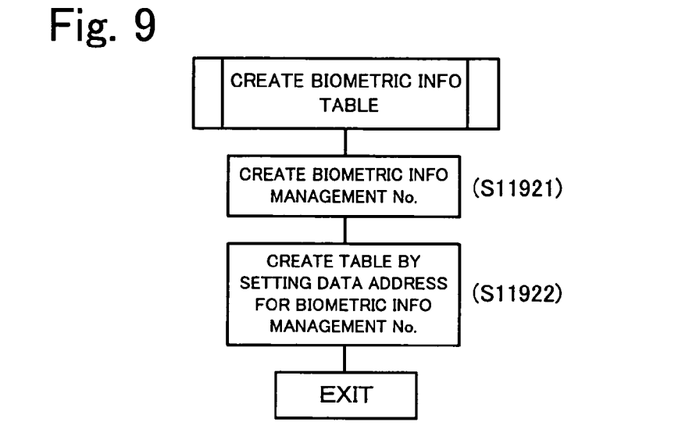
FIG. 9 is a flowchart showing the contents to be processed in biometric information table creation processes.
Figure 10:
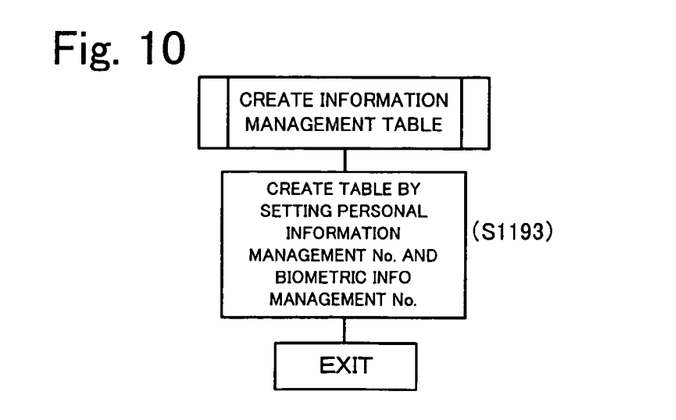
FIG. 10 is a flowchart showing the contents to be processed in information management table creation processes.

FIGS. 8, 9 and 10 are flowcharts showing processes of personal data table creating processes (step S1191), biometric information table creating processes (step S1192) and information management table creating processes (step S1193), respectively.

In personal data table creating processes shown in FIG. 8 (step S1191 in FIG. 7), a personal information management No. (number) is generated (step S11911) and an ID is set for the generated personal information management No. and a personal data table (see FIG. 5) is created with those numbers.

In biometric information table creating processes shown in FIG. 9 (step S1192 in FIG. 7), a biometric information management No. is generated (step S11921), a data address representing the location of biometric information is set for the generated biometric information management No. and a biometric information table (see FIG. 5) is created with those numbers (step S11922).

In information management table creating processes shown in FIG. 10 (step S1193 in FIG. 7), the personal information management No. and the biometric information management No. are set and an information management table is created with those numbers.

The personal data table, the biometric information table and the information management table created in the abovementioned manner are stored in a biometric information file on the memory 210 and the SRAM 240 shown in FIG. 5 along with biometric information 1 and 2 generated at the division/combination processes of biometric information (step S118 in FIG. 7) (step S120 in FIG. 7).

The personal data table with IDs set, and the biometric information table or the information data itself are not directly linked here. They are only linked via the information management table. If data in the biometric information file is stolen, the data in the biometric information file is unlikely to be abused and advanced security can be kept, because of this linking method and the abovementioned division/combination of biometric information, and further, encryption processes.

Figure 11:
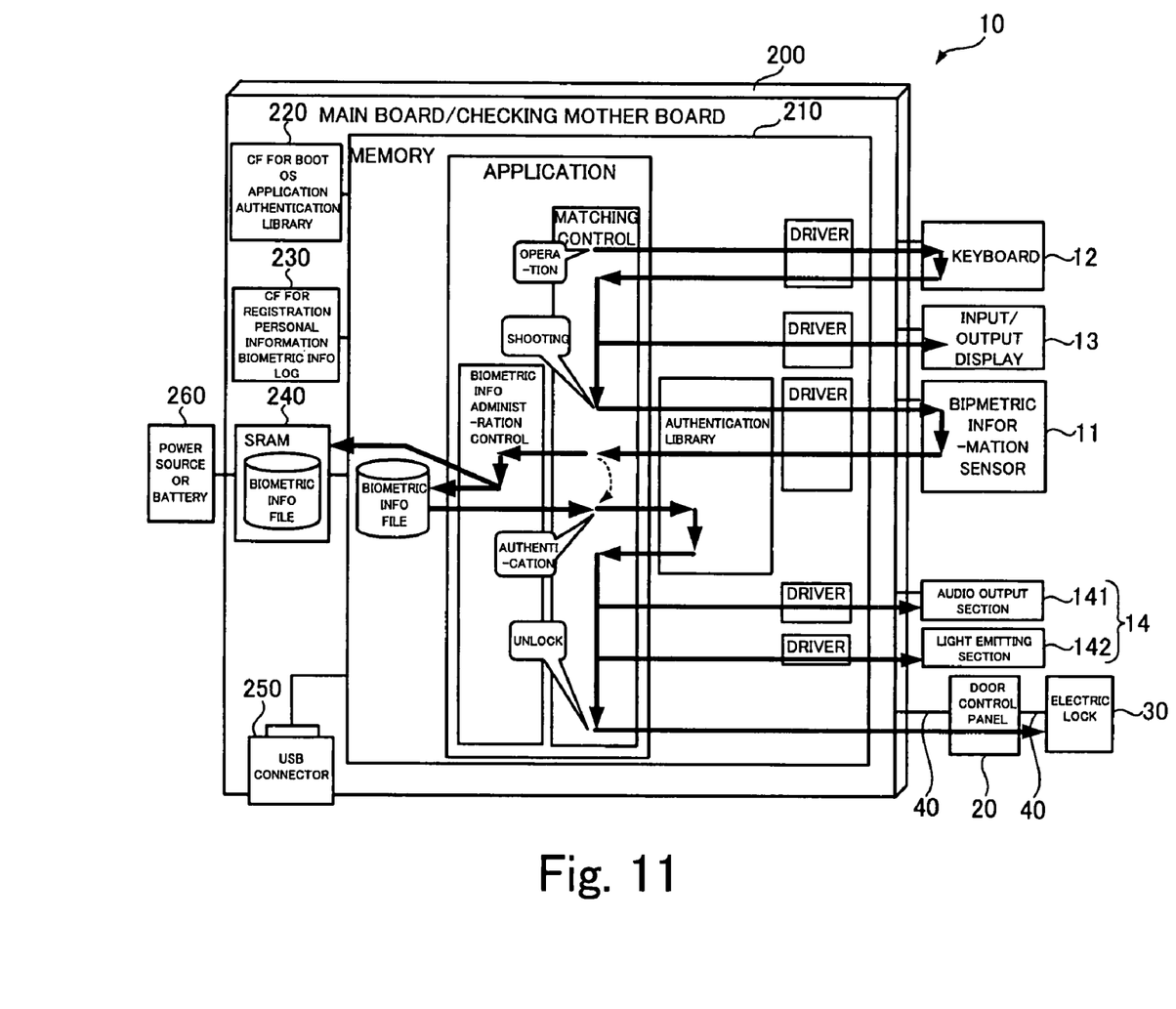
FIG. 11 is a diagram showing a configuration required for authentication within the inside configuration of the gate controller.
Figure 12:
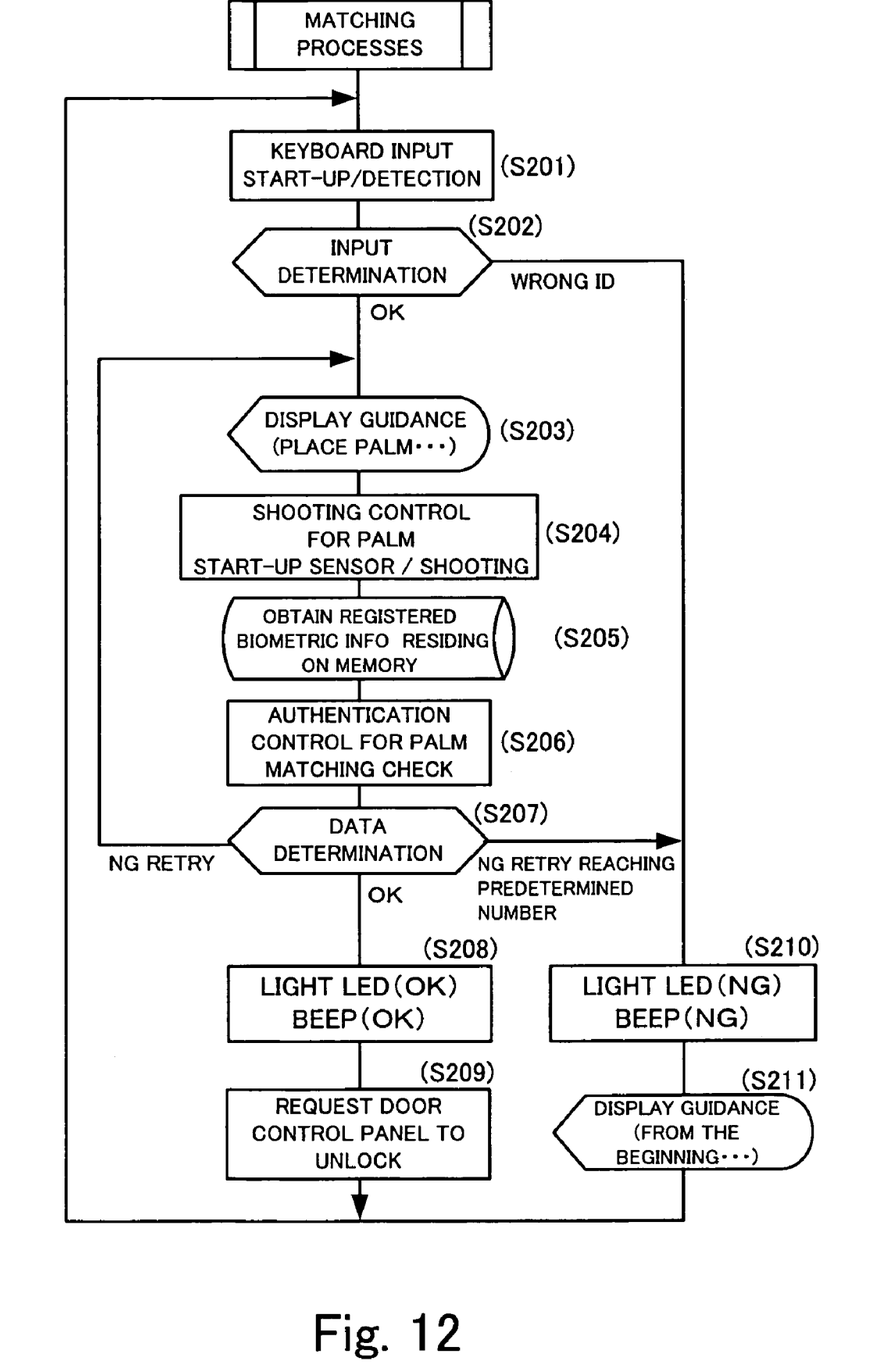
FIG. 12 is a flowchart showing matching processes.

FIG. 11 is a diagram showing a configuration required for authentication within the inside configuration of the gate controller and FIG. 12 is a flowchart showing checking processes.

Usually the matching process program is executed in the gate controller. First, an input sensor of the keyboard 12 is started (a balloon "Operation" in FIG. 11), ID input from the keyboard 12 is detected (step S201) and determination whether the input ID is right or wrong is performed (step S202) here. The determination whether the ID is right or not is based on whether it is the registered ID or not.

When the ID is determined right at step S202, guidance for the person to place a palm over the biometric information sensor 11 is displayed on the input/output display 13 (step S203) and shooting control for the palm (start-up of the biometric information sensor and shooting of a palm; a balloon "Shooting" in FIG. 11) is performed (step S204). Further, memory-resident registered biometric information corresponding to the ID, i.e., biometric information, which is associated with the currently input ID via the information management table, in the biometric information file on the memory 210 shown in FIG. 11 is retrieved, and processes reverse to the biometric information division/combination processes at step S118 shown in FIG. 7 (e.g., processes of retrieving biometric information 1 and 2 for a person C from the biometric information table and recovering the original biometric information "a" and "b") is performed (step S205), and a palm authentication control (matching check), i.e., matching check between the biometric information, which the authentication library has obtained by the current shooting, and the biometric information obtained at step S205 is required, and the check result is passed (step S206; a balloon "Authentication" in FIG. 11). The biometric information file on the SRAM 240 is backup and not used at authentication.

When the abovementioned matching check result is OK, i.e., when biometric information matching with the biometric information obtained by the current shooting (step S204) exists in the biometric information obtained at step S205, an LED indicating OK is lit on the light emitting section 142 and beeps indicating OK is performed at the audio output section 141 (step S208), and the door control panel 20 is required to unlock the electric key (step S209; a balloon "Unlock" key in FIG. 11).

When the result of data determination at step S207 is matching check NG, i.e., when biometric information matching with the biometric information obtained by the current shooting does not exist in the biometric information obtained at step S205, the process returns to step S203, where matching processes are performed again. If the matching check NG is given for predetermined number, the process proceeds to step S210, where the LED light indicating NG is lit on the light emitting section 142 and the beeps indicating NG is performed at the audio output section 141, guidance for the person to restart, i.e., restart the input of the person's ID is displayed on the input/output display 13, and the process proceeds to step S201 and waits for the ID to be input.

In the gate controller 10, processes other than those described here, such as canceling processes of registering a user or an administrator or changing processes of IDs are performed, though, they are not the subject here and description thereof is omitted.

A palm is used as a source to obtain biometric information here, though, the biometric information is not limited to it and other types of biometric information which can be used for recognizing a person, for example, a pupil, a finger or a face can be used.

Although an example of using the result of a personal authentication that controls the opening and closing of the door has been described here, the object of the present invention is not the use of the personal authentication result. Thus, the present invention can be applied for any use.

What is claimed is:

1. A personal authentication apparatus that stores biometric information of a person obtained at past registration, and checks the person's biometric information obtained at the current authentication against the biometric information obtained and stored at the registration to authenticate the person, comprising:

an information obtaining section which obtains at least two kinds of original biometric information for the person;

a scrambling section that performs scrambling in which each of said at least two kinds of original biometric information are each divided into multiple parts and at least two kinds of scrambled biometric information are made, said at least two kinds of scrambled biometric information including first scrambled information in which a first part of a first one of said at least two kinds of original biometric information is combined with a first part of a second one of said at least two kinds of original biometric information and second scrambled information in which a second part of said first one of said at least two kinds of original biometric information is combined with a second part of said second one of said at least two kinds of original biometric information, to register the personal biometric information, an information storing section that stores said at least two kinds of scrambled biometric information made in the scrambling section for each person;

a descrambling section that performs descrambling in which said at least two kinds of scrambled biometric information stored in the information storing section are read, and said at least two kinds of original biometric information area restored by descrambling inversely to the scrambling, to authenticate the person; and a personal authentication section that authenticates a person associated with the current biometric information for authentication by receiving the current biometric information for authentication from the information obtaining section, and causing the descrambling section to restore said at least two kinds of original biometric information for the person by the descrambling, and checking the biometric information for authentication against each of said at least two kinds of original biometric information.

2. The personal authentication apparatus according to claim 1, wherein the information obtaining section obtains the person's ID or an ID of a group to which the person belongs that is associated with the person, in addition to the person's biometric information; and wherein the information storing section stores both an ID associated with the person obtained by the information obtaining section and said at least two kinds of scrambled biometric information of the person without directly associating said ID and said at least two kinds of scrambled biometric information with each other, and stores associating information that associates the ID with said at least two kinds of scrambled biometric information to register the personal biometric information.

3. The personal authentication apparatus according to claim 1, wherein the personal authentication section causes the information obtaining section to obtain current biometric information for authentication corresponding to one of at least two kinds of original biometric information of the person obtained at registration, checks the current biometric information for authentication against each of said at least two kinds of original biometric information obtained by descrambling, and determines whether the current biometric information for authentication matches one of said at least two kinds of original biometric information to authenticate the person.

4. The personal authentication apparatus according to claim 2, wherein the personal authentication section causes the information obtaining section to obtain both an ID corresponding to a person and current biometric information for authentication the person, and checks the current biometric information for authentication against each of said at least two kinds of original biometric information obtained by descrambling said at least two kinds of scrambled biometric information associated with the same ID as the obtained ID according to the associating information to authenticate the person.

5. The personal authentication apparatus according to claim 1, wherein the personal authentication section checks current biometric information for authentication obtained by the information obtaining section and each of said at least two kinds of original biometric information for registered persons to authenticate the person.

6. The personal authentication apparatus according to claim 1, wherein the information obtaining section comprises a biometric information sensor that detects biometric information.

7. The personal authentication apparatus according to claim 6, wherein the biometric information sensor is a sensor that detects a biometric pattern.

8. A personal authentication method that stores biometric information of a person obtained at past registration, and checks the person's biometric information obtained for the current authentication against the biometric information obtained and stored at the registration to authenticate the person, comprising:

obtaining at least two kinds of original biometric information for the person, scrambling said at least two kinds of original biometric information such that each of said at least two kinds of original biometric information is divided into multiple parts and at least two kinds of scrambled biometric information are made, said at least two kinds of scrambled biometric information including first scrambled information in which a first part of a first one of said at least two kinds of original biometric information is combined with a first part of a second one of said at least two kinds of original biometric information and second scrambled information in which a second part of said first one of said at least two kinds of original biometric information is combined with a second part of said second one of said at least two kinds of original biometric information, storing said at least two kinds of scrambled biometric information to register the personal biometric information; and obtaining current biometric information for authentication, and descrambling said at least two kinds of scrambled biometric information into said at least two kinds of original biometric information by descrambling inversely to the scrambling, and checking the current biometric information for authentication against each of said at least two kinds of original biometric information to authenticate the person associated with the current biometric information.

9. The personal authentication apparatus according to claim 1,
wherein said at least two kinds of original biometric information are a biometric pattern of a right hand and a biometric pattern of a left hand, and
wherein the scrambling section subjects the biometric pattern of the right hand and the biometric pattern of the left hand to scrambling in which a first part of said biometric pattern of the right hand and a first part of said biometric pattern of the left hand are combined to make said first scrambled information and a second part of said biometric pattern of the right hand and a second part of the biometric pattern of the left hand are combined to make said second scrambled information.

10. The personal authentication apparatus according to claim 1,
wherein said at least two kinds of original biometric information are a biometric pattern of a pupil of a right eye and a biometric pattern of a pupil of a left eye, and
wherein the scrambling section subjects the biometric pattern of the pupil of the right eye and the biometric pattern of the pupil of the left eye to scrambling in which a first part of said biometric pattern of the pupil of the right eye and a first part of said biometric pattern of the pupil of the left eye are combined to make said first scrambled information and a second part of said biometric pattern of the pupil of the right eye and a second part of the biometric pattern of the pupil of the left eye are combined to make said second scrambled information.

11. The personal authentication apparatus according to claim 1,
wherein said at least two kinds of original biometric information are a biometric pattern of a finger of a right hand and a biometric pattern of a finger of a left hand, and
wherein the scrambling section subjects the biometric pattern of the finger of the right hand and the biometric pattern of the finger of the left hand to scrambling in which a first part of said biometric pattern of the finger of the right hand and a first part of said biometric pattern of the finger of the left hand are combined to make said first scrambled information and a second part of said biometric pattern of the finger of the right hand and a second part of the biometric pattern of the finger of the left hand are combined to make said second scrambled information.

12. The personal authentication method according to claim 8,
wherein said at least two kinds of original biometric information are a biometric pattern of a right hand and a biometric pattern of a left hand, and
wherein said scrambling section subjects the biometric pattern of the right hand and the biometric pattern of the left hand to scrambling in which a first part of said biometric pattern of the right hand and a first part of said biometric pattern of the left hand are combined to said first scrambled information and a second part of said biometric pattern of the right hand and a second part of the biometric pattern of the left hand are combined to make said second scrambled information.

13. The personal authentication method according to claim 8,
wherein said at least two kinds of original biometric information are a biometric pattern of a pupil of a right eye and a biometric pattern of a pupil of a left eye, and
wherein said scrambling section subjects the biometric pattern of the pupil of the right eye and the biometric pattern of the pupil of the left eye to scrambling in which a first part of said biometric pattern of the pupil of the right eye and a first part of said biometric pattern of the pupil of the left eye are combined to make said first scrambled information and a second part of said biometric pattern of the pupil of the right eye and a second part of the biometric pattern of the pupil of the left eye are combined to make said second scrambled information.

14. The personal authentication method according to claim 8,
wherein said at least two kinds of original biometric information are a biometric pattern of a finger of a right hand and a biometric pattern of a finger of a left hand, and
wherein said scrambling section subjects the biometric pattern of the finger of the right hand and the biometric pattern of the finger of the left hand to scrambling in which a first part of said biometric pattern of the finger of the right hand and a first part of said biometric pattern of the finger of the left hand are combined to make said first scrambled information and a second part of said biometric pattern of the finger of the right hand and a second part of the biometric pattern of the finger of the left hand are combined to make said second scrambled information.

* * * * *